(12) United States Patent  
Holtstiege et al.

(10) Patent No.: US 12,080,937 B2  
(45) Date of Patent: Sep. 3, 2024

(54) HEATABLE VEHICLE WINDOW HAVING A TRANSPONDER

(71) Applicant: SAINT-GOBAIN GLASS FRANCE, Courbevoie (FR)

(72) Inventors: Thomas Holtstiege, Schwelm (DE); Tim Schmitz, Aachen (DE); David Bertel, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 315 days.

(21) Appl. No.: 17/607,201

(22) PCT Filed: Jun. 3, 2020

(86) PCT No.: PCT/EP2020/065304  
§ 371 (c)(1),  
(2) Date: Oct. 28, 2021

(87) PCT Pub. No.: WO2020/259971  
PCT Pub. Date: Dec. 30, 2020

(65) Prior Publication Data  
US 2022/0223995 A1 Jul. 14, 2022

(30) Foreign Application Priority Data  
Jun. 24, 2019 (EP) .................. 19181981

(51) Int. Cl.  
*H01Q 1/12* (2006.01)  
*B60J 1/00* (2006.01)  
(Continued)

(52) U.S. Cl.  
CPC ............ *H01Q 1/1278* (2013.01); *B60J 1/001* (2013.01); *G06K 7/10366* (2013.01);  
(Continued)

(58) Field of Classification Search  
CPC .... H01Q 1/1278; H01Q 15/14; H01Q 1/2225; H01Q 19/28; B60J 1/001; B60J 1/00;  
(Continued)

(56) References Cited

U.S. PATENT DOCUMENTS 5,266,960 A * 11/1993 Lindenmeier ............ H01Q 1/32  
343/704  
5,646,637 A * 7/1997 Miller ..................... H01Q 13/10  
343/770  
(Continued)

FOREIGN PATENT DOCUMENTS

CN 106462791 A 2/2017  
CN 107404777 A 11/2017  
(Continued)

OTHER PUBLICATIONS

Singh, D., et al., "Frequency doubling active transponder in car wind screen," Electronics Letters, IEE Stevenage, vol. 33, No. 21, Oct. 1997, 2 pages.

(Continued)

*Primary Examiner* — Nay Tun  
(74) *Attorney, Agent, or Firm* — Pillsbury Winthrop Shaw Pittman LLP

(57) ABSTRACT

A vehicle window includes a glass pane, an electrically conductive functional component, at least two busbars, wherein the electrically conductive functional component is electrically conductively connected to the busbars such that when an electrical voltage is applied to the busbars, a current can flow through the electrically conductive functional component, a transponder having an antenna and a control unit for communicating with a reader, wherein the control unit includes a memory for storing identification data, wherein a reflector is associated with and spaced apart from the transponder for increasing an antenna gain of the antenna, (Continued)

Figure 1:
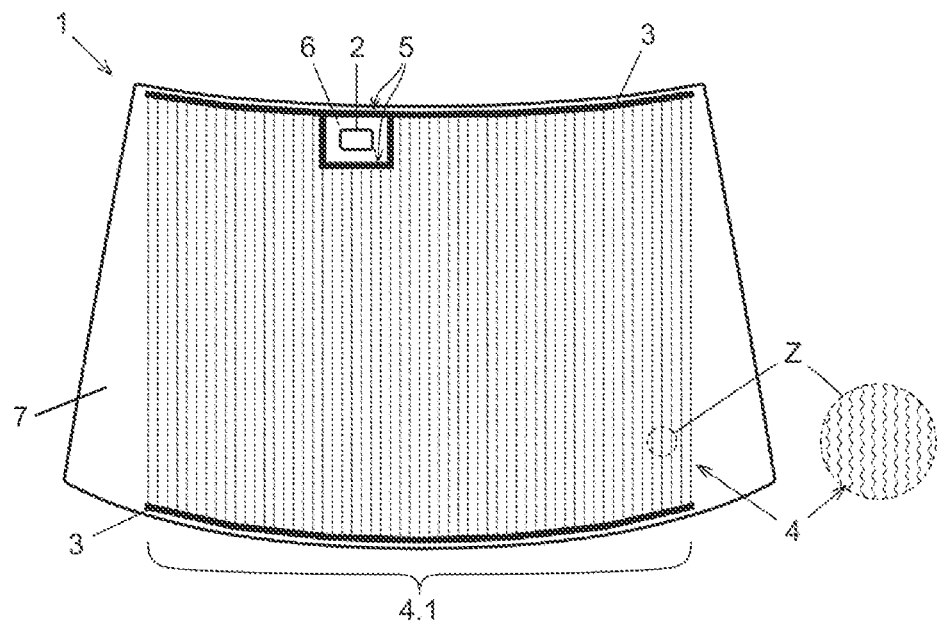

wherein the reflector is formed at least partially by one of the two busbars.

18 Claims, 3 Drawing Sheets

(51) Int. Cl.
  *G06K 7/10* (2006.01)
  *H01Q 15/14* (2006.01)
  *H05B 3/86* (2006.01)
(52) U.S. Cl.
  CPC .............. *H01Q 15/14* (2013.01); *H05B 3/86* (2013.01); *H05B 2203/016* (2013.01)
(58) Field of Classification Search
  CPC ......... G06K 7/10366; G06K 19/07794; G06K 19/07773; H05B 3/86; H05B 2203/016
  See application file for complete search history.

(56) References Cited

U.S. PATENT DOCUMENTS

| | | | | |
|---|---|---|---|---|
| 5,898,407 | A * | 4/1999 | Paulus | H01Q 1/1271 343/713 |
| 6,008,473 | A * | 12/1999 | Gillner | H05B 3/84 219/202 |
| 6,765,177 | B2 * | 7/2004 | Noguchi | C03C 17/36 219/203 |
| 7,106,262 | B2 * | 9/2006 | Baranski | H01Q 1/1278 343/770 |
| 7,642,976 | B2 * | 1/2010 | Taniguchi | H01Q 5/364 343/713 |
| 7,764,239 | B2 * | 7/2010 | Baranski | B32B 17/10174 343/704 |
| 7,782,206 | B2 * | 8/2010 | Burnett | G06K 19/07327 340/572.1 |
| 8,022,883 | B2 * | 9/2011 | Shinkawa | H01Q 1/1278 343/711 |
| 8,546,729 | B2 * | 10/2013 | Derda | H05B 3/86 219/203 |
| 8,809,742 | B2 * | 8/2014 | Reul | B32B 17/10036 219/203 |
| 9,758,021 | B2 * | 9/2017 | Gansen | H01Q 1/325 |
| 2002/0005398 | A1 * | 1/2002 | Gillner | B32B 17/10036 219/203 |
| 2002/0015824 | A1 | 2/2002 | Kawamoto et al. | |
| 2002/0044069 | A1 * | 4/2002 | Jenkinson | G08G 1/017 340/928 |
| 2004/0169605 | A1 | 9/2004 | Komatsu et al. | |
| 2005/0195114 | A1 * | 9/2005 | Yegin | H01Q 1/325 343/713 |
| 2007/0216589 | A1 * | 9/2007 | Li | H01Q 1/1271 343/711 |
| 2008/0106480 | A1 * | 5/2008 | Nagayama | H01Q 1/1278 343/713 |
| 2009/0128431 | A1 * | 5/2009 | Martin | B32B 17/10376 343/713 |
| 2010/0085261 | A1 * | 4/2010 | Baranski | B32B 17/10018 343/713 |
| 2010/0097278 | A1 * | 4/2010 | Kubota | H01Q 1/1278 343/713 |
| 2010/0220020 | A1 * | 9/2010 | Tadokoro | H01Q 1/3275 343/713 |
| 2012/0098715 | A1 * | 4/2012 | Dai | H01Q 1/1285 343/712 |
| 2013/0300146 | A1 * | 11/2013 | Ogawa | E06B 5/18 296/84.1 |
| 2015/0170019 | A1 | 6/2015 | Beenken | |
| 2016/0342883 | A1 * | 11/2016 | Huhtasalo | G06K 19/07794 |
| 2018/0090811 | A1 * | 3/2018 | Kagaya | H01Q 9/30 |
| 2019/0165447 | A1 * | 5/2019 | Furlan | H01Q 21/26 |
| 2019/0348753 | A1 | 11/2019 | Song et al. | |

FOREIGN PATENT DOCUMENTS

| | | |
|---|---|---|
| CN | 109411864 A1 | 3/2019 |
| CN | 209562833 U | 10/2019 |
| DE | 43 23 239 A1 | 1/1995 |
| DE | 19 922 699 A1 | 12/2000 |
| DE | 10 2011 083665 A1 | 4/2013 |
| DE | 10 2015 002614 A1 | 8/2015 |
| DE | 10 2016 013 938 A1 | 5/2017 |
| EP | 1 434 301 A1 | 6/2004 |
| JP | S62-049703 A | 3/1987 |
| JP | S62-49703 A | 3/1987 |
| JP | H04-326203 A | 11/1992 |
| JP | H11-127012 A | 5/1999 |
| JP | 2002-135025 A | 5/2002 |
| JP | 2002-271127 A | 9/2002 |
| JP | 2002-359565 A | 12/2002 |
| JP | 2004-214820 A | 7/2004 |
| JP | 2006-151373 A | 6/2006 |
| JP | 2006-310953 A | 11/2006 |
| JP | 2012-060248 A | 3/2012 |
| JP | 2012-104980 A | 5/2012 |
| JP | 2014-176077 A | 9/2014 |
| JP | 3211259 U | 6/2017 |
| JP | 2017-176077 A | 10/2017 |
| JP | 2017-183084 A | 10/2017 |
| JP | 2018-502428 A | 1/2018 |
| WO | WO 2018/055390 A1 | 3/2018 |

OTHER PUBLICATIONS

International Search Report as issued in International Patent Application No. PCT/EP2020/065304, dated Jul. 29, 2020.
Chinese Office Action as issued in Chinese Patent Application No. 202080001408.4, dated Dec. 12, 2023.

* cited by examiner

HEATABLE VEHICLE WINDOW HAVING A TRANSPONDER

CROSS-REFERENCE TO RELATED APPLICATIONS

This application is the U.S. National Stage of PCT/EP2020/065304, filed Jun. 3, 2020, which in turn claims priority to European patent application number 19181981.2 filed Jun. 24, 2019. The content of these applications are incorporated herein by reference in their entireties.

The invention relates to a vehicle window having a transponder, a method for its production, and the use of the vehicle window in means of transportation.

Transponders that are situated on objects, e.g., goods and merchandise, and that are read by readers with transmitting and receiving units are generally known. Such a transponder is used for identification of these objects and is usually part of an identification system. Such systems for identification consist, among other things, of a stationary reader and a mobile transponder attached to the object to be identified. Nowadays, the mobile transponder is an RFID (radio frequency identification) transponder consisting of an RFID chip and a separate antenna.

Reliability when reading an identification signal is of great importance, for example, in road traffic. The communication between the reader and the mobile transponder with the known radio-technology problems of unwanted reflection, absorption, and shielding often leads to inadequate reading results and writing results in the communication with the respective transponder. The known reading systems, which often have the form of a gate through which a vehicle to be registered and equipped with an RFID transponder drives, have the disadvantage that the identification signal can sometimes not be detected due to the low signal strength.

DE 10 2016 013 938 A1 describes a vehicle device with an electronic identification and/or payment unit having an RFID unit. The RFID unit comprises a reading element and an output element. The reading element is arranged in a vehicle interior and detects the identification and/or payment information of an RFID chip. The identification and/or payment information detected is duplicated and copied into the output element. The output element is arranged on the outside of the vehicle and transmits the identification and/or payment information to an external reader without contact. Apart from the high outlay of electronic components required, the reading element must be installed on the outside of the vehicle and is not shielded against the environment such that undesirable interactions with the environment can occur.

JP 2002 359565 discloses a vehicle having a navigation system that can establish a connection with a mobile radio terminal outside the vehicle via a relay arranged on the ceiling.

JP H04326203 discloses a windshield having a patch antenna.

DE 43 23 239 A1 describes an antenna structure fora motor vehicle rear window having conductor sections arranged symmetrically relative to the center of the window.

The object of the invention is, consequently, to provide a vehicle window having a transponder that has increased communication quality.

The object was, consequently, successfully accomplished by a vehicle window in accordance with claim 1 and a vehicle in accordance with claim 13. Preferred embodiments of the invention are reflected in the dependent claims.

The invention relates to a vehicle window comprising a first glass pane, an electrically conductive functional component, at least two busbars, and a transponder. The electrically conductive functional component is electrically conductively connected to the busbars such that when an electrical voltage is applied to the busbars, a current can flow through the electrically conductive functional component. The transponder has at least an antenna and a control unit for communicating with a reader, wherein the control unit includes a memory for storing identification data. The control unit is preferably a semiconductor chip that has the memory for storing identification data. The control unit is provided to control the antenna and to process a signal received or transmitted by the antenna.

Both the control unit with the memory and the antenna can be arranged on a substrate. The substrate can have a dielectric material that is bonded via an exterior-side surface of the substrate to a surface of the glass pane, preferably by gluing. The vehicle window has at least one reflector associated with the transponder, which is spaced apart from the transponder and is provided for increasing an antenna gain of the antenna.

According to the invention, the reflector is formed at least partially by one of the two busbars. Provision is further made that the transponder and the reflector can be arranged within the vehicle window. The specific position on or in the vehicle window follows from the term "associated reflector" in that it must, of course, be associated with the respective antenna position and must be adequately dimensioned to achieve an amplifying effect.

In order to increase the antenna gain of a transponder on a vehicle window, the radiation is bundled. Via the reflector, the radiation of the antenna can be bundled such that an increased antenna gain results. The amplification of a signal transmitted and received by the transponder thus achieved can in particular be measured particularly well from a direction perpendicular to the surface of the vehicle window. The higher antenna gain increases the range and sensitivity of the transponder such that the transponder can be detected from a greater distance by a corresponding external reader.

The glass pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyimide, polyester, polyvinyl chloride, and/or mixtures thereof. The glass pane is preferably transparent, in particular for use in a vehicle, for example, as a windshield or rear window, or other applications in which high light transmittance is desired. In the context of the invention, "transparent" means a pane that has transmittance of more than 70% in the visible spectral range. For vehicle panes that are not in the traffic-relevant field of vision of the driver, for example, for roof panels, the transmittance can, however, also be much lower, for example, greater than or equal to 5%.

The vehicle window according to the invention is suitable for separating the interior of a vehicle from an external environment. The reader of the transponder that can receive signals from the transponder is situated in the external environment (in short, in outside space).

The vehicle window can have any three-dimensional shape. Preferably, the glass pane is planar or slightly or strongly curved in one or more spatial directions. The panes can be colorless or colored.

The thickness of the glass pane can vary widely and thus be ideally adapted to the requirements of the individual case. Preferably, standard thicknesses from 1.0 mm to 25 mm, preferably from 1.4 mm to 2.5 mm, are used for vehicle glass. The size of the glass pane can vary widely and is governed by the size of the application according to the invention. The glass pane has, for example, areas from 200 cm$^2$ up to 3 m$^2$ customary in vehicle construction.

Advantageously, the vehicle window can be completed at the end of the production process or not until the subsequent site of use in that the transponder is attached at the location provided for this. The substrate can be very thin and transparent such that the transponder situated on the vehicle window is quite inconspicuous. The substrate can be plate-like and have a constant material thickness (thickness).

According to another advantageous further development of the invention, the transponder is an RFID transponder. In particular, UHF RFID transponders have a semiconductor chip that is characterized by its small dimensions relative to the antenna.

In another embodiment of the invention, the transponder operates in a frequency range from 800 MHz to 3 GHz, preferably to 2.45 GHz, particularly preferably from 860 MHz to 930 MHz. The dimensions of the antenna generally depend on the desired frequency band and the respective application.

It is further proposed that the identification data be provided for identification of a vehicle. Thus, the assignment of a transponder to a vehicle can be advantageously achieved.

According to an advantageous further development of the invention, operation of the transponder is energy self-sufficient.

The vehicle window according to the invention preferably includes a conductor system with a heating function as an electrically conductive functional component. The conductor system has a plurality of resistance elements arranged between the two busbars and serving as heating conductors.

The heating conductors consist of resistance wires running vertically and substantially parallel to one another having a diameter of approx. 20 µm to 200 µm, preferably 0.09 mm (90 µm), particularly preferably 20 µm to 30 µm. They are preferably laid in a wavelike manner at a mutual distance of approx. 1 mm to 5 mm and run substantially perpendicular to the antenna of the transponder. In principle, straight resistance wires are also possible as heating conductors. Other embodiments of the heating field are conceivable, for example, with heating wires running horizontally and busbars running vertically. The invention is also applicable in such cases, except that the cutouts of the heating field with the busbars routed around them are then positioned laterally in the pane.

The busbars can in each case be implemented as a printed, electrically conductive paste, preferably a silver-containing screen printing paste or as an electrically conductive conductor, preferably made of metal and, in particular, of copper, silver, gold, or aluminum. Copper has proved itself for such conductors, since it has good electrical conductivity. At the same time, the material costs are low with copper.

The vehicle window advantageously has two busbars. A first busbar can run in the vicinity of a first glass pane edge; and a second busbar, in the vicinity of a second pane edge opposite the first glass pane edge.

One busbar serves at least partially as a reflector for reflecting electromagnetic waves and is suitably designed for this purpose, in other words, it has a length and distance from the transponder antenna suitable for reflection in the desired frequency range. The busbar can also be implemented, for example, in wire form or as a flat conductor. A line conductor as a reflector is stable to handle and is stably attached to the vehicle window during storage.

In accordance with a preferred further development of the invention, the reflector has at least two parallel sections of a busbar, wherein the sections of the busbar are arranged such that these sections are provided for reflection of a signal to be transmitted from the antenna. This further development is based on the knowledge that many vehicle windows have two busbars running almost parallel to one another. The conductor system can extend over at least a portion of a surface of the glass pane or be integrated in a plane of the vehicle pane extending parallel thereto.

The transponder or the surface of the orthogonal projection of the transponder relative to the vehicle window can be arranged centrally between two parallel sections of a busbar. This makes possible a transponder with a reflector arrangement that is particularly easy to manufacture.

In another expedient further development of the invention, the reflector can be implemented as a square, a rectangle, or a trapezoid. The square, rectangle, or trapezoid can have an opening on one side. The width of the opening can equal as much as one side length of the square, rectangle, or trapezoid. This has the advantage of providing a high level of flexibility relative to other components of the vehicle, such as mirrors or cameras that can be positioned in the immediate vicinity of the reflector structure.

The transponder or the surface of the orthogonal projection of the transponder are arranged in a region of the vehicle window transparent to electromagnetic radiation in the frequency range of the antenna. In other words, the region transparent to electromagnetic radiation in the frequency range of the antenna overlaps the transponder in a perpendicular orientation relative to the glass pane. The region transparent to electromagnetic radiation consists, depending on the frequency used, of only a radius of a few centimeters around the transponder.

The region transparent to electromagnetic radiation in the frequency range of the antenna is a region in which the conductor system is not arranged.

If the busbars and the transponder are arranged in one plane of the vehicle window, for example, if the transponder is arranged on the pane surface on which the conductor system with the two busbars also extends, then at least one section of a busbar can surround the transponder.

According to another advantageous further development of the invention, at least one busbar includes an extension beyond the region of the resistance wires. In this case, the extensions [sic] has a bend. As a result of the bend, the extension is angled in a direction that is preferably vertical relative to the busbar. Thus, the extension runs substantially parallel to the side edges of the vehicle window. The busbar can have an extension at each of its two ends.

The transponder or the surface of the orthogonal projection of the transponder can be arranged in the region partially or completely bordered by the extension. The region partially or completely bordered by the extension is situated outside the conductor system with a heating function.

According to another advantageous further development of the invention, the vehicle window has a first glass pane that is joined to a second glass pane via a thermoplastic intermediate layer. Basically, all electrically insulating substrates that are thermally, chemically, and dimensionally stable under the conditions of the production and use of the vehicle window according to the invention are suitable as the glass pane. The transponder is preferably attached on an interior-side surface of the second glass pane.

Alternatively, the transponder and/or the reflector can be arranged between the first and the second glass pane in the intermediate layer.

In another advantageous embodiment of the vehicle window according to the invention, the busbars are situated on at least one of the surfaces, in particular an inner surface, of the first and/or second glass pane. Alternatively, the busbars can be integrated in the intermediate layer. The busbars are then preferably applied on a carrier film. The carrier film preferably contains a polymer, in particular polyvinyl butyral (PVB), ethylene vinyl acetate (EVA), polyurethane (PU), polyethylene terephthalate (PET), or combinations thereof.

The first and/or second glass pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The first and/or the second glass pane are preferably transparent, in particular for use in a vehicle, for example, as a windshield or rear window, or other applications in which high light transmittance is desired.

The intermediate layer can be formed by one or even a plurality of films arranged one over the other or next to one another, wherein the thickness of a film is preferably from 0.025 mm to 1 mm, typically 0.38 mm or 0.76 mm. The intermediate layers can preferably be thermoplastic, and, after lamination, can bond the inner pane and the outer glass pane (the first and second glass pane) and any other intermediate layers to one another.

The lamination, i.e., the joining of the first glass pane and the second glass pane via the intermediate layer, is preferably done under the action of heat, vacuum, and/or pressure. Lamination methods can be used to produce the laminated pane.

The thickness of the first and/or second glass pane can vary widely and thus be ideally adapted to the requirements of the individual case. Preferably, standard thicknesses from 1.0 mm to 25 mm, preferably from 1.4 mm to 2.5 mm, are used for vehicle glass.

The vehicle window according to the invention is suitable for all vehicles, e.g., motor vehicles, trains, watercraft, or aircraft, with motor vehicles particularly preferred. Examples of suitable motor vehicles are buses, tractors, trucks, and passenger cars, with passenger cars particularly preferred.

In a preferred embodiment, the vehicle window is a windshield, a roof panel, a rear window, a rear side window, or a front side window, preferably in a motor vehicle.

The combination of technical features described according to the invention results in a vehicle window in which the antenna gain of the transponder is optimized.

Another aspect of the invention comprises a method for producing a vehicle window, wherein at least:
- a transponder having an antenna and a control unit for communicating with a reader is fastened on a surface of a glass pane, wherein the control unit has a memory for storing identification data, and
- a reflector associated with and spaced apart from the transponder is arranged on a surface of the glass pane, wherein the reflector is formed at least partially by one of the two busbars and and is provided for increasing an antenna gain of the antenna.

In an advantageous embodiment of the method according to the invention, the transponder is arranged on a substrate, wherein the substrate is bonded to the surface of the glass pane with an adhesive.

The invention also includes the use of the vehicle window according to one of claims 1 through 12 in means of transportation for travel on land, in the air, or on water, in particular in motor vehicles, for example, as a windshield, side window, rear window, and/or roof panel.

The invention also relates to a vehicle including at least one vehicle window according to the invention, wherein the vehicle is preferably a motor vehicle.

The invention is further explained in the following using nonrestrictive exemplary embodiments with reference to the accompanying drawings.

Figure 2:
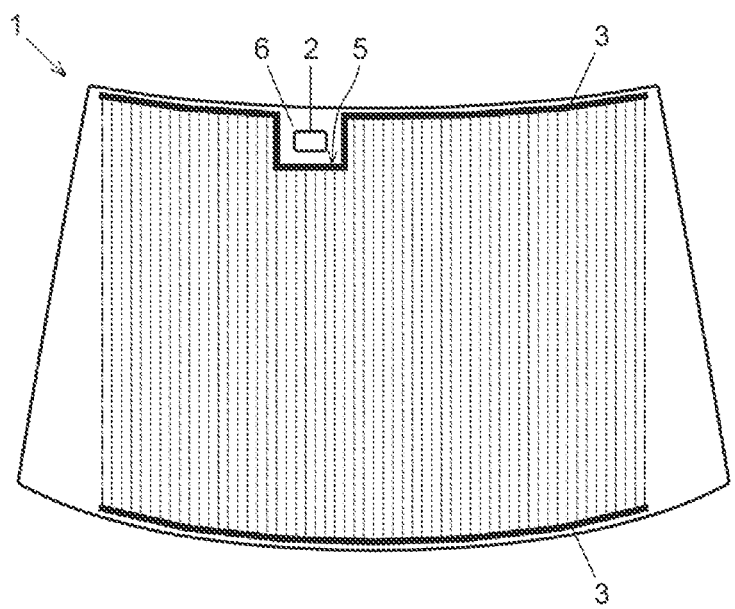
Figure 3:
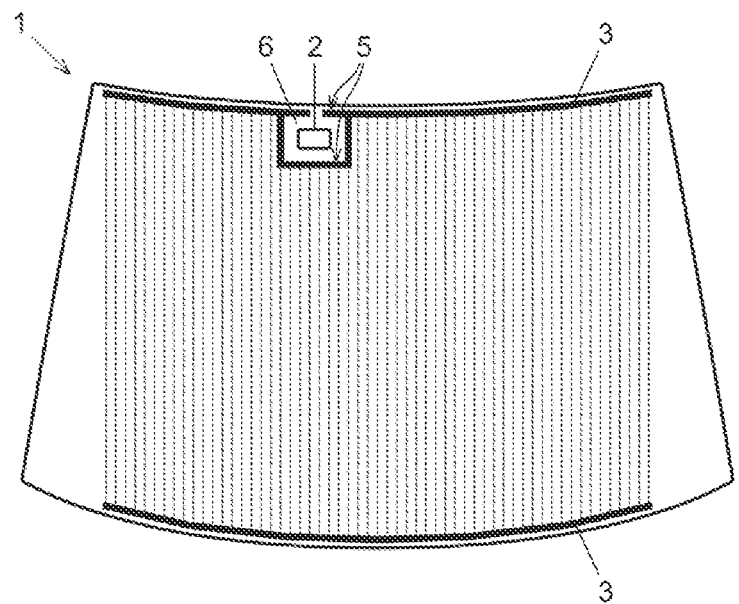
Figure 4:
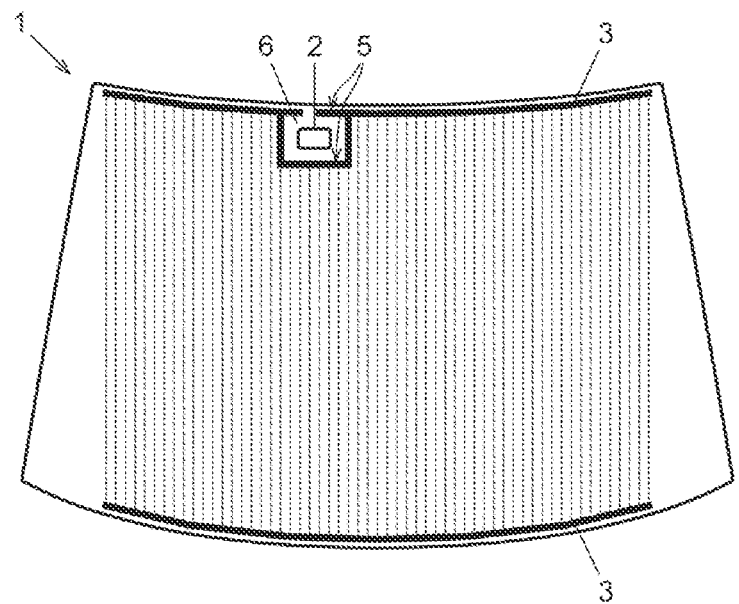
Figure 5:
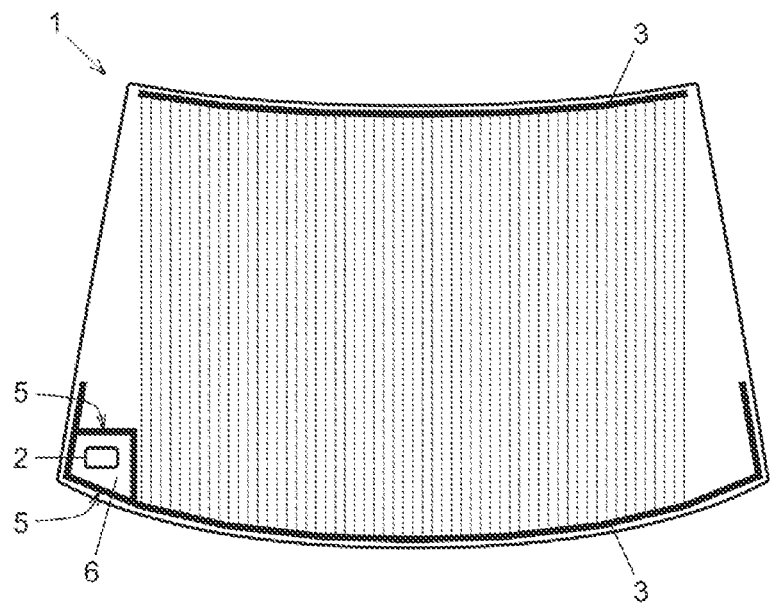
Figure 6:
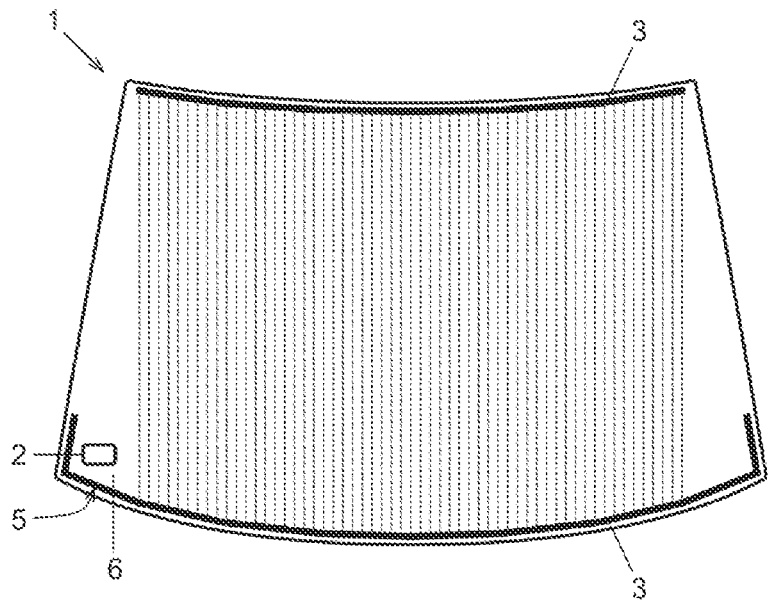

The invention is explained in the following and in the accompanying figures. They depict:

FIG. 1 a plan view of a vehicle window according to the invention having a transponder;

FIG. 2 an alternative exemplary embodiment of a vehicle window according to the invention having a transponder, FIG. 3 another alternative exemplary embodiment of a vehicle window according to the invention having a transponder, FIG. 4 another alternative exemplary embodiment of a vehicle window according to the invention having a transponder, FIG. 5 another alternative exemplary embodiment of a vehicle window according to the invention having a transponder, and FIG. 6 another alternative exemplary embodiment of a vehicle window according to the invention having a transponder.

FIG. 1 depicts a plan view of a vehicle window 1 according to the invention. In this example, the vehicle window 1 is implemented as a windshield of a passenger car and equipped with a transponder 2. The vehicle window 1 further includes a glass pane 7 and a reflector 5 associated with and spaced apart from the transponder. The reflector 5 is provided to increase the antenna gain.

The dimensions of the vehicle window 1 are, for example, 0.9 m×1.5 m. The transponder 2 is arranged in the upper, lateral region of the vehicle window 1. Alternatively, the transponder 2 can be arranged at other locations of the vehicle window 1, for example, in the upper, central region of the vehicle window 1. When determining a position for the transponder, it is important to find a suitable position with a good connection to the reader. In addition, possible other vehicle parts that could be situated in the vicinity of the window, such as mirrors or cameras, must be taken into account.

The transponder 2 is a so-called "UHF RFID transponder" (data carrier for radio frequency identification) having an antenna and a control unit. The control unit includes a memory for storing identification data and serves for communicating with an external reader. The antenna can be a planar antenna that has a symmetrical meandering structure. The antenna can assume other very different shapes.

To read out the transponder 2, an external reader generates an electromagnetic alternating field tuned to the transponder 2. The electromagnetic alternating field is modulated with an interrogation signal. The transponder 2 transmits an individualizing signal when exposed to a corresponding electromagnetic alternating field. Such transponders operate in the frequency range from 860 MHz to 930 MHz, the so-called "ultra high frequencies" (UHF). Accordingly, the size of the antenna is matched to these frequencies.

The transponder 2 can be implemented as an active or passive transponder. The active transponder 2 can receive the energy for the signal transmitted by the transponder from a separate energy source associated with the transponder 2. The passive transponder 2 draws the energy for sending back individualizing signals from the energy of the electromagnetic alternating field generated by the reader. After the transponder 2 has transmitted the signal, the signal is received by the external reader situated within the range of the signal.

The vehicle window 1 includes the transponder 2 and a conductor system 4 with a heating function. The conductor system 4 has resistance elements serving as electrical heating conductors. The heating conductors consist of resistance wires running vertically and substantially parallel to one another that have a diameter of approx. 20 μm to 30 μm. They are preferably laid in a wavelike manner at a mutual distance of approx. 1 mm to 5 mm and form a heating field 4.1. The wave shape of the resistance wires is discernible in an enlarged view in the detail Z of the heating field 4.1. The heating conductors run substantially perpendicular to the antenna of the transponder. The heating field 4.1 has a substantially rectangular shape.

The heating conductors run between two current-carrying busbars 3. An upper bus bar 3 is arranged at a distance of approx. 5 cm from the upper glass pane edge; a lower bus bar 3, at a distance of approx. 8 cm.

Sections of the upper busbar 3 serve as the reflector 5. They reflect a signal received or transmitted by the transponder. These sections are implemented substantially as a rectangle that surrounds the transponder 2 centrally. The rectangle has a length of 130 mm and a width of 110 mm. The rectangle formed in sections by the upper busbar 3 is asymmetrically shifted toward the front seat passenger's side.

Such a reflector 5 reflects incoming and outgoing electromagnetic radiation waves from the transponder 2 via these sections of the busbars 3. The bundling of the radiation results in amplification of the antenna signal.

The heating conductors and the transponder 2 are arranged on the same surface of the glass pane 7, with the transponder 2 being situated in a region 6 of the glass pane 7 where no heating conductors or other metallizations are present. This region 6 is thus, in principle, transparent to electromagnetic radiation, in particular in the frequency range of the transponder 2. The length and width of the region 6 are adapted to the frequency range of the transponder 2, its specific design, and its installation situation in the vehicle as a whole.

Alternatively, the vehicle window 1 can be implemented as a composite pane, in which the conductor system 4 is arranged in a planar manner on or in the vehicle window 1. The composite pane comprises the first glass pane 7, which is joined to a second glass pane via a thermoplastic intermediate layer. In cross-section, such a vehicle window 1 has the first, outer glass pane 7, an intermediate layer, and a second, inner glass pane. "Inner glass pane", also called "inner pane", refers to that pane that faces the interior in the installed position of the vehicle. "Outer glass pane 7", also called "outer pane" refers to that pane that faces the outside environment in the installed position.

The intermediate layer is preferably a PVB film. In addition, further intermediate layers can be arranged between the first, outer glass pane and the second, inner glass pane. The intermediate layers can include polyvinyl butyral, ethylene vinyl acetate, polyurethane, and/or mixtures and/or copolymers thereof and a polymer film. Preferably, a layer of polyvinyl butyral (PVB) with a polyethylene terephthalate film (PET) is used. Such intermediate layers can have infrared-reflecting properties.

The second, inner glass pane is, for example, intended to face the interior of the vehicle in the installed position. In other words, it has an interior-side surface IV that is accessible from the interior, whereas the exterior-side surface I of the first, outer glass pane faces outward relative to the vehicle interior. The first, outer glass pane and the second, inner glass pane are made, for example, of soda lime glass. The thickness of the second, inner glass pane is, for example, 1.6 mm; and the thickness of the first, outer glass pane is 2.1 mm. It goes without saying that the second, inner glass pane and the first, outer glass pane, for example, can also have the same thickness. The intermediate layer preferably has a thickness of 0.76 mm.

In this exemplary embodiment, the transponder 2 can be arranged on the interior-side surface IV of the second, inner glass pane. The transponder 2 is situated in a region of the vehicle window 1 in which the region 6 is arranged on the interior-side surface II of the first, outer glass pane 7. The region 6 is thus positioned opposite the transponder 2. The region 6 is transparent to electromagnetic radiation in the frequency range of the transponder 2 such that the signal emitted by the transponder 2 from the vehicle interior in the direction of the vehicle exterior penetrates the second, inner glass pane and the first, outer glass pane in the region 6.

Alternatively, the transponder 2 can also be arranged in the intermediate layer of the vehicle window 1.

FIG. 2 depicts an alternative exemplary embodiment of a vehicle window 1 according to the invention of FIG. 1. In contrast to FIG. 1, the reflector 5 associated with the transponder 2 is implemented as an incomplete rectangle, of which one long side is missing.

FIG. 3 and FIG. 4 depict in each case another alternative exemplary embodiment of the vehicle window 1 according to the invention of FIG. 1. In contrast to FIG. 1, the reflector 5 associated with the transponder 2 is implemented as an incomplete rectangle, of which one long side has an interruption.

FIG. 5 and FIG. 6 depict in each case another alternative exemplary embodiment of the vehicle window 1 according to the invention of FIG. 1. In contrast to FIG. 1, the lower bus bar 3 is extended at both ends beyond the region of the resistance wires. The transponder 2 is in each case arranged in a region 6 outside the heating field 4.1. The extensions of the lower bus bar 3 have in each case a bend. Due to the bend, the extensions are angled in one direction, preferably in a vertical direction. As a result, the ends of the extensions run essentially parallel to the side edges of the vehicle window 1.

In FIG. 5, the transponder 2 is completely bordered by the extension.

In FIG. 6, the transponder is only partially bordered by the extension, by two lateral sections (one horizontal, one vertical) of the lower busbar 3. The reflector 5 consists essentially of the horizontal lateral section of the lower busbar 3, which is arranged at a similar distance from the transponder 2 as the lower reflector in FIG. 1 to FIG. 4.

Alternatively, the transponder 2 and/or the conductor system 4 with the two busbars 3 can be arranged on the interior-side surface IV of the second, inner glass pane. Then, the busbars 3 consist of a silver-containing screen printing paste which is applied on the vehicle window by baking or printing. The layer thickness of the baked silver paste is preferably from 5 μm to 20 μm.

The invention makes available a vehicle window 1, in which the signal of the transponder 2 is amplified mainly in a direction perpendicular to the surface of the vehicle window and in a vertical angular range of approx. ±45° relative to the main amplification direction. In an advantageous embodiment of the invention, an increased antenna gain of the transponder 2 is achieved by designing the busbars 3, at least in sections, as a reflector 5. This was unexpected and surprising for the person skilled in the art.

LIST OF REFERENCE CHARACTERS

1 vehicle window
2 transponder
3 busbar
4 conductor system
4.1 heating field
5 reflector
6 region transparent to electromagnetic radiation in the frequency range of the antenna
7 glass pane

The invention claimed is:

1. A vehicle window, comprising:
   a glass pane,
   an electrically conductive functional component,
   at least two busbars, wherein the electrically conductive functional component is electrically conductively connected to the at least two busbars such that when an electrical voltage is applied to the at least two busbars, a current can flow through the electrically conductive functional component,
   a transponder having an antenna and a control unit for communicating with a reader, wherein the control unit includes a memory for storing identification data,
   wherein a reflector is associated with and spaced apart from the transponder for increasing an antenna gain of the antenna, wherein the reflector is formed at least partially by one of the two busbars.

2. The vehicle window according to claim 1, wherein the reflector includes at least two parallel sections of a busbar, and wherein the sections of the busbar are arranged such that the sections are provided for reflection of a signal of the antenna to be transmitted.

3. The vehicle window according to claim 2, wherein the transponder or a surface of the orthogonal projection of the transponder is arranged centrally between two parallel sections of a busbar.

4. The vehicle window according to claim 1, wherein the reflector is implemented as a square, a rectangle, or a trapezoid.

5. The vehicle window according to claim 1, wherein the transponder or a surface of the orthogonal projection of the transponder is arranged in a region of the vehicle window that is transparent to electromagnetic radiation in a frequency range of the antenna.

6. The vehicle window according to claim 1, wherein the reflector borders a region of the vehicle window that is transparent to electromagnetic radiation in a frequency range of the antenna.

7. The vehicle window according to claim 1, wherein the electrically conductive functional component is implemented as a conductor system with a heating function.

8. The vehicle window according to claim 7, wherein the conductor system has a plurality of resistance wires as heating conductors, which run substantially perpendicular to the antenna of the transponder.

9. The vehicle window according to claim 1, wherein a first busbar runs in the vicinity of a first pane edge and a second busbar runs in the vicinity of a second pane edge opposite the first pane edge.

10. The vehicle window according to claim 1, wherein at least one of the two busbars has an extension with a bend.

11. The vehicle window according to claim 1, wherein the glass pane is joined to a second glass pane via a thermoplastic intermediate layer.

12. The vehicle window according to claim 1, wherein the vehicle window is a motor vehicle window.

13. The vehicle, including a vehicle window according to claim 1, wherein the vehicle is a motor vehicle.

14. A method for producing a vehicle window according to claim 1, comprising:
    fastening the transponder having an antenna and a control unit for communicating with a reader on a surface of the glass pane, wherein the control unit has a memory for storing identification data, and
    arranging the reflector associated with and spaced apart from the transponder on a surface of the glass pane, wherein the reflector is formed at least partially by one of the two busbars and is provided for increasing an antenna gain of the antenna.

15. A method comprising installing the vehicle window according to claim 1 in a transportation vehicle for travel on land, in the air, or on water.

16. The method according to claim 15, wherein the transportation vehicle is a motor vehicle.

17. The method according to claim 15, wherein the vehicle window is a windshield, a rear window, or a roof panel.

18. The vehicle window according to claim 1, wherein the reflector is out of contact with the transponder.

* * * * *